United States Patent
Douba et al.

(10) Patent No.: US 9,423,313 B2
(45) Date of Patent: Aug. 23, 2016

(54) PRESS MACHINE BRAKING PERFORMANCE VERIFYING APPARATUS

(71) Applicant: KOMATSU INDUSTRIES CORPORATION, Kanazawa-shi, Ishikawa (JP)

(72) Inventors: Eiji Douba, Komatsu (JP); Masaaki Takada, Komatsu (JP); Hitoshi Sakurai, Komatsu (JP); Hisanori Takeuchi, Nomi (JP)

(73) Assignee: KOMATSU INDUSTRIES CORPORATION, Ishikawa (JP)

( * ) Notice: Subject to any disclaimer, the term of this patent is extended or adjusted under 35 U.S.C. 154(b) by 468 days.

(21) Appl. No.: 14/128,073

(22) PCT Filed: Feb. 18, 2013

(86) PCT No.: PCT/JP2013/053872
§ 371 (c)(1),
(2) Date: Dec. 20, 2013

(87) PCT Pub. No.: WO2013/136915
PCT Pub. Date: Sep. 19, 2013

(65) Prior Publication Data
US 2014/0200711 A1    Jul. 17, 2014

(30) Foreign Application Priority Data
Mar. 15, 2012  (JP) .................. 2012-058138

(51) Int. Cl.
*G06F 19/00*  (2011.01)
*G01L 5/28*  (2006.01)
(Continued)

(52) U.S. Cl.
CPC ............... *G01L 5/284* (2013.01); *B30B 12/00* (2013.01); *B30B 15/148* (2013.01)

(58) Field of Classification Search
CPC ........ G01L 5/28; G01L 5/284; G07C 5/0808; B60T 14/221
See application file for complete search history.

(56) References Cited

U.S. PATENT DOCUMENTS 3,982,418 A * 9/1976 Leavesley ............... G01L 5/284
100/99
3,993,898 A * 11/1976 Guliani ................. B30B 15/285
250/215

(Continued)

FOREIGN PATENT DOCUMENTS

JP          7-290296 A       11/1995
JP          9-10997 A         1/1997

(Continued)

OTHER PUBLICATIONS

International Search Report for PCT/JP2013/053872, issued on May 21, 2013.

*Primary Examiner* — Darrin Dunn
(74) *Attorney, Agent, or Firm* — Global IP Counselors, LLP

(57) ABSTRACT

A press machine braking performance verifying apparatus verifies performance of brakes applying braking to a slide. The press machine braking performance verifying apparatus includes a speed detecting component, a stopping instruction detecting component, a stopping time measuring component, a maximum stopping time calculating component and an evaluating component. The speed detecting component detects a slide driving speed. The stopping instruction detecting component detects if stopping of the slide is instructed. The stopping time measuring component measures a stopping time until the slide stops when a stopping instruction is detected. The maximum stopping time calculating component calculates predicted stopping time in a case where the slide is driven at a maximum driving speed based on the slide driving speed after detecting the stopping instruction and the stopping time. The evaluating component evaluates performance of the brakes by comparing the predicted stopping time and a threshold valve set in advance.

18 Claims, 7 Drawing Sheets

(51) Int. Cl.
*B30B 15/14* (2006.01)
*B30B 12/00* (2006.01)

(56) References Cited

U.S. PATENT DOCUMENTS

| | | | | |
|---|---|---|---|---|
| 4,021,647 A * | 5/1977 | Meier | B30B 15/28 | 377/20 |
| 4,048,886 A * | 9/1977 | Zettler | B30B 15/28 | 192/144 |
| 4,205,603 A * | 6/1980 | Baker, Jr. | B30B 15/28 | 100/35 |
| 5,285,721 A * | 2/1994 | Sugimoto | B30B 15/148 | 100/43 |
| 5,868,020 A * | 2/1999 | Delaney | B30B 15/142 | 700/206 |
| 6,769,355 B1 * | 8/2004 | Schmitz | B30B 15/142 | 100/257 |
| 7,187,996 B2 * | 3/2007 | Tanaka | B30B 15/0041 | 100/43 |
| 7,644,995 B2 * | 1/2010 | Haller | B60T 17/22 | 303/11 |
| 9,280,858 B2 | 3/2016 | Cahill | B60T 17/221 | |
| 9,283,945 B1 * | 3/2016 | Kernwein | B60T 17/228 | |
| 2003/0217639 A1 * | 11/2003 | Ferguson | F15B 15/24 | 92/13 |
| 2004/0084252 A1 * | 5/2004 | DeVlieg | B60T 8/1703 | 188/1.11 W |
| 2007/0173984 A1 * | 7/2007 | Nakayama | B60T 7/12 | 701/1 |
| 2009/0255329 A1 * | 10/2009 | Connell | G01L 5/28 | 73/121 |
| 2010/0292889 A1 * | 11/2010 | Cahill | B60T 8/1703 | 701/29.1 |
| 2011/0132208 A1 * | 6/2011 | Asakawa | B21D 22/00 | 100/35 |
| 2011/0144879 A1 * | 6/2011 | Miller | B60T 17/22 | 701/70 |
| 2011/0214496 A1 * | 9/2011 | Cahill | B60T 17/221 | 73/121 |
| 2011/0219863 A1 * | 9/2011 | Whatley | B26B 21/14 | 73/121 |
| 2011/0245970 A1 * | 10/2011 | Wells | B25J 19/004 | 700/245 |
| 2013/0060404 A1 * | 3/2013 | Cahill | B60T 17/221 | 701/3 |
| 2013/0145833 A1 * | 6/2013 | Cahill | B60T 17/221 | 73/121 |
| 2014/0365053 A1 * | 12/2014 | Pita-Gil | B60L 7/22 | 701/22 |
| 2015/0252861 A1 * | 9/2015 | Jantunen | G01L 5/28 | 324/537 |

FOREIGN PATENT DOCUMENTS

| | | |
|---|---|---|
| JP | 2005-199314 A | 7/2005 |
| JP | 2007-203353 A | 8/2007 |
| JP | 2009-160622 A | 7/2009 |

* cited by examiner

PRESS MACHINE BRAKING PERFORMANCE VERIFYING APPARATUS

CROSS-REFERENCE TO RELATED APPLICATIONS

This application is a U.S. National stage application of International Application No. PCT/JP2013/053872, filed on Feb. 18, 2013. This U.S. National stage application claims priority under 35 U.S.C. §119(a) to Japanese Patent Application No. 2012-058138, filed in Japan on Mar. 15, 2012, the entire contents of which are hereby incorporated herein by reference.

BACKGROUND

1. Field of the Invention

The present invention relates to a braking performance verifying apparatus, and in particular, to a braking performance verifying apparatus for a press machine for verifying performance of brakes which apply braking to a slide.

2. Background Information

An electric servo press as a press machine has a servo motor, a power converting mechanism, a brake apparatus, and the like. The power converting mechanism has a ball screw, an eccentricity mechanism, a link mechanism, and the like, and rotational driving force of the servo motor is converted to an up and down reciprocating movement of a slide. Then, a work piece is press processed between an upper mold and a lower mold using the reciprocating movement of the slide.

There are cases where a runaway monitoring apparatus is provided in such an electric servo press as shown in Japanese Unexamined Patent Application Publication No. 2005-199314. In the runaway monitoring apparatus, the press speed is detected for each passing of a predetermined period of time after a deceleration and stopping instruction signal is input with regard to the servo motor. Then, it is determined whether or not the press speed which is detected exceeds a setting value which is set in advance, and braking is mechanically applied to the electric servo press using the brake apparatus in a case where it is determined that the press speed exceeds the setting value.

SUMMARY

A safety apparatus is provided in the electric servo press to be separate to the runaway monitoring apparatus as described above. The safety apparatus stops activation of the electric servo press using the brake apparatus in a case where the operator approaches the electric servo press by going past the safety apparatus. It is necessary to know the stopping time from instructing stopping such as emergency stopping to actual stopping of the slide in order to decide the position where a safety apparatus such as this is positioned.

In detail, it is necessary for the safety apparatus to be arranged so that the time until the operator reaches from the safety apparatus to the electric servo press is longer than the stopping time when the electric servo press is activated at the maximum speed in a case where the operator approaches the electric servo press by going past the safety apparatus. In order to achieve this, it is necessary to know the stopping time from instructing stopping to stopping of the slide in a case where there is an instruction for emergency stopping or the like when the slide is being reciprocated at the maximum driving speed.

In order to know the stopping time in this manner, a manual mode for measuring the stopping time is set in the electric servo press. Then, it is necessary to perform a verifying operation in the manual mode with daily checks and to verify the stopping time since the stopping time changes due to attrition of a friction member in the brake apparatus and the like.

However, an operation such as this is complicated. Then, there are cases where deterioration in braking performance is not noticed when the operator neglects the verifying operation described above and the stopping time is longer than the predicted time.

The problem as described above is not limited to the electric servo press and occurs in the same manner in mechanical press units which use a flywheel.

The object of the present invention is for it to be possible to easily automatically verify braking performance in a press machine.

A press machine braking performance verifying apparatus according to a first aspect of the present invention is for verifying performance of brakes which apply braking to a slide and is provided with a speed detecting means, a stopping instruction detecting means, a stopping time measuring means, a maximum stopping time calculating means, and an evaluating means. The speed detecting means detects slide driving speed for driving the slide. The stopping instruction detecting means detects that stopping of the slide is instructed. The stopping time measuring means measures stopping time until the slide stops when a stopping instruction is detected. The maximum stopping time calculating means calculates predicted stopping time in a case where the slide is driven at the maximum driving speed on the basis of the slide driving speed after detecting of a stopping instruction and the stopping time. The evaluating means evaluates performance of the breaks by comparing the predicted stopping time which is calculated by the maximum stopping time calculating means and a threshold valve which is set in advance.

In the apparatus, the stopping time until the slide stops is measured in a case where urgent stopping is instructed due to, for example, blocking of a light beam from a light-beam safety apparatus during a press operation. Since the slide driving speed at the time when stopping is instructed and the stopping time are in a proportional relationship, it is possible to predict the stopping time in a case where the slide is driven at the maximum driving speed using calculation on the basis of the slide driving speed at the time right after stopping is instructed and the stopping time. Then, the predicted stopping time is compared to the threshold value which is set in advance and braking performance is evaluated.

Here, braking performance is automatically verified each time that urgent stopping is instructed due to, for example, blocking of a light beam from the light-beam safety apparatus. Accordingly, it is possible to verify and evaluate braking performance each time there is urgent stopping even in a case where the operator neglects daily checks in a manual mode.

A press machine braking performance verifying apparatus according to a second aspect of the present invention is the apparatus of the first aspect which is further provided an execution limiting means which executes the stopping time measuring means, the maximum stopping time calculating means, and the evaluating means only in a case where the slide driving speed when the stopping instruction is detected is a predetermined speed or more.

Here, the relationship between speed and stopping time is unstable due to variation in a kinetic friction coefficient in the braking apparatus and the like in a case where the slide driving speed is low.

Therefore, in the apparatus in the second aspect, the verifying process is executed only in a case where the slide driving speed is the predetermined speed or more. In other words, the verifying process is not executed in a case where the slide driving speed does not reach the predetermined speed. Due to this, it is possible to acquire an accurate predicted stopping time.

A press machine braking performance verifying apparatus according to a third aspect of the present invention is the apparatus of the first or the second aspect wherein the stopping time which is measured by the stopping time measuring means is the sum of idle time from detecting of a stopping instruction to the start of braking and braking time from the start of braking to stopping of the slide. In addition, the maximum stopping time calculating means executes the following process.

A deceleration coefficient is determined from the slide driving speed at a predetermined timing during the braking time and the time from the predetermined timing to stopping of the slide.

The predicted stopping time is calculated from fixed stopping time, where the time from the start of braking to the predetermined timing is added to the idle time, the maximum driving speed of the slide, and the deceleration coefficient.

In the braking apparatus, braking does not necessarily start instantaneously even when the stopping instruction is received. There is idle time such as time from the start of movement of members such as a plate, which is pressed against a friction member which configures the braking apparatus, to the member abutting against the friction member.

Therefore, in the apparatus in the third aspect, the fixed stopping time, where the time until the braking force of the braking apparatus is stabilized is added, is first considered in addition to the idle time when the predicted stopping time is calculated. In addition, the deceleration coefficient is determined from the slide driving speed at the predetermined timing during braking and the time from the predetermined timing to stopping when there is a stopping instruction. The predicted stopping time when the slide is driven at the maximum driving speed is determined from the fixed stopping time, the deceleration coefficient, and the maximum driving speed of the slide as above.

A press machine braking performance verifying apparatus according to a fourth aspect of the present invention is the apparatus of the third aspect wherein the fixed stopping time is a fixed value which is set in advance.

Here, the fixed stopping time is determined in advance based on the specifications of the braking apparatus and the like or by experimentation and is set as a fixed value.

A press machine braking performance verifying apparatus according to a fifth aspect of the present invention is the apparatus of the third aspect which is further provided with a speed change detecting means and a fixed stopping time calculating means. The speed change detecting means detects a change in the slide driving speed and determines whether or not the change in speed exceeds a predetermined threshold value. The fixed stopping time calculating means calculates the time from the timing when the stopping instruction is detected to the timing when the change in speed exceeds the predetermined threshold value as the fixed stopping time.

In the braking apparatus, attrition of the friction member and the other constituent components and the like occurs due to use over a long period of time and consequently the idle time changes. In a case where the idle time changes, it is not possible to accurately verify braking performance when a fixed value is used as the fixed stopping time which includes the idle time.

Therefore, in the apparatus in the fifth aspect, calculation of the fixed stopping time which includes the idle time is also performed along with the process of verifying the braking performance.

Here, it is possible to accurately verify braking performance since braking performance is verified by also taking into consideration the braking apparatus side.

A press machine braking performance verifying apparatus according to a sixth aspect of the present invention is the apparatus of any of the first to the fifth aspects which is further provided with a movement direction detecting means which detects the movement direction of the slide. Then, the stopping time measuring means, the maximum stopping time calculating means, and the evaluating means executes the process only when a stopping instruction is detected when the slide is being lowered.

In the press machine, a work piece holding spring is provided on a punch side and a die cushion for raising the work piece is provided. Such a mechanism is activated in a direction which lifts the slide upward when the slide is being raised. That is, the mechanism is activated in a direction which adds to the slide driving speed when the slide is being raised. It is not possible to accurately grasp the stopping time when executing the verifying process as above with such circumstances.

Therefore, in the apparatus in the sixth aspect, the verifying process as above is executed when the slide is being lowered and not when the slide is being raised. As a result, it is possible to accurately measure the stopping time.

A press machine braking performance verifying apparatus according to a seventh aspect of the present invention is the apparatus of any of the first to the sixth aspects wherein the evaluating means has a warning value which is set in advance and an abnormal value which is larger than the warning value. Then, the evaluating means gives notification of a warning in a case where the predicted stopping time is equal to or more than the warning value and is less than the abnormal value and prohibits activation of the press machine in a case where the predicted stopping time is the abnormal value or more.

A press machine braking performance verifying apparatus according to an eighth aspect of the present invention is the apparatus of any of the first to the seventh aspects which is further provided with a signaling means. The signaling means determines whether or not a predetermined period of time has passed since an evaluation was carried out by the evaluating means. Then, signaling means signals a warning such that the braking performance verifying process is executed in a case where an evaluation has not been performed by the evaluating means after the predetermined period of time has passed.

According to the apparatus of the present invention, the burden on an operator is reduced since verifying of braking performance is automatically performed. However, a case is assumed where there are no instructions such as urgent stopping for a long period of time.

Therefore, in the apparatus in the eighth aspect, a warning is signaled to the operator so that the braking performance verifying process is executed in a case where the verifying process has not been performed for a predetermined period of time.

A press machine braking performance verifying apparatus according to a ninth aspect of the present invention is the apparatus of the seventh aspect which is further provided with an operating means for executing a braking performance verifying test and a test permitting means. The test permitting means permits activation in order to verify braking performance in a case where the operating means is operated even in a case where activation of the press machine is prohibited by the evaluating means.

In the apparatus in the seventh aspect, activation of the press machine is prohibited in a case where the predicted stopping time is the abnormal value or more. However, the braking apparatus has an important function for the press machine.

Therefore, in the apparatus in the ninth aspect, it is possible to execute activation in order to carry out the braking performance verifying process by an operation of the operating member even in a case where activation of the press machine is prohibited by the evaluating means.

A press machine braking performance verifying apparatus according to a tenth aspect of the present invention is the apparatus of the ninth aspect which is provided with an acceptance determining means and a cancelling means. The acceptance determining means determines whether or not the result of verifying of braking performance by the operating means and the test permitting means satisfies a predetermined standard. The cancelling means cancels prohibiting of activation of the press machine by the evaluating means in a case where it is determined that braking performance satisfies the predetermined standard by the acceptance determining means.

In the present invention as above, it is possible to automatically verify braking performance in a press machine when there is an instruction for urgent stopping, emergency stopping, or the like.

DETAILED DESCRIPTION OF THE EMBODIMENT(S)

Configuration

Figure 1:
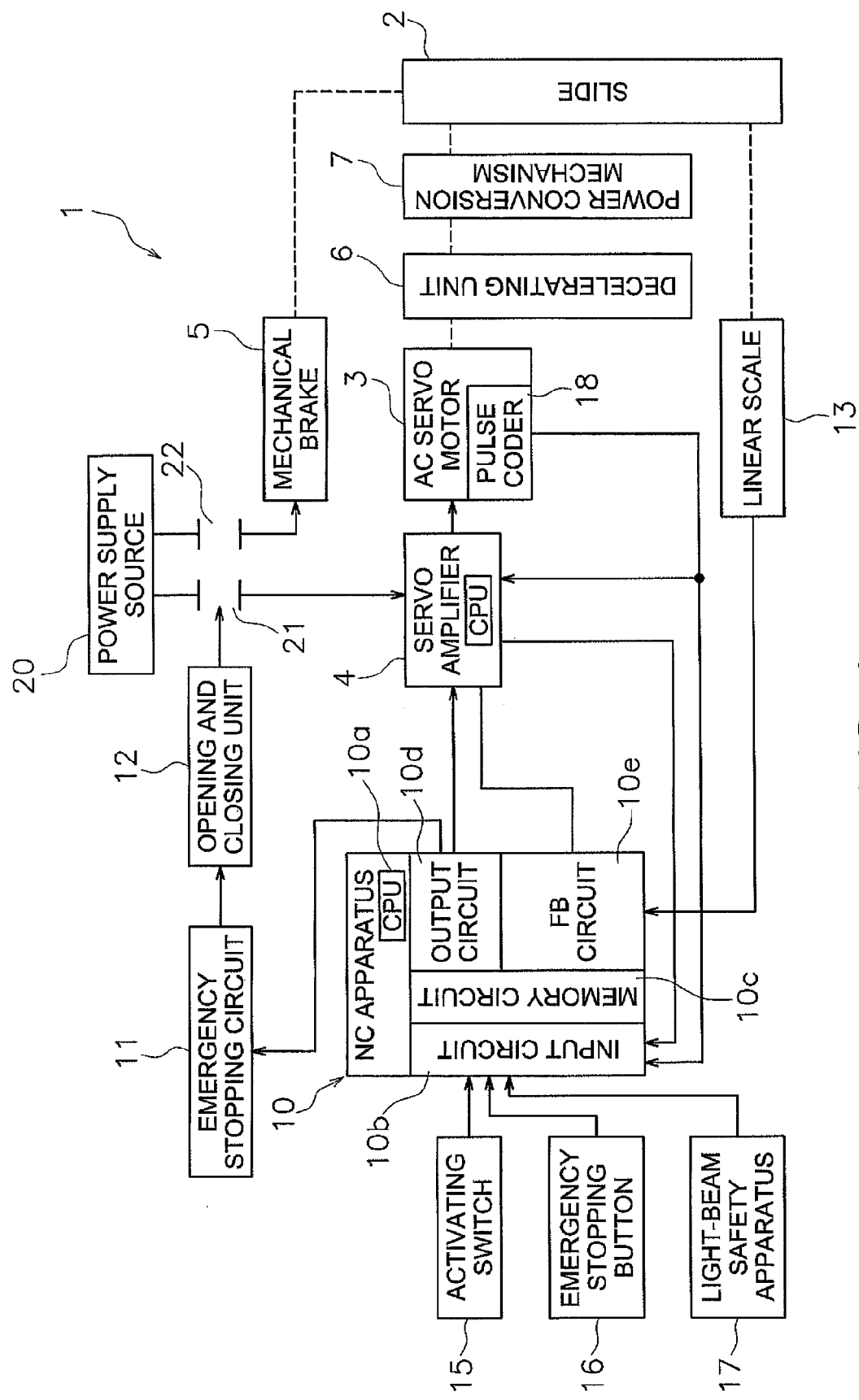
FIG. 1 is a system block diagram of a press machine braking performance verifying apparatus according to an embodiment of the present invention.

FIG. 1 shows a block diagram of an electric servo press which is provided with a braking performance verifying apparatus according to an embodiment of the present invention. An electric servo press 1 has a slide 2, an AC servo motor 3, a servo amplifier 4, and a mechanical brake apparatus 5 (referred to below simply as "brake apparatus") as a braking apparatus. The slide 2 is supported in a liftable manner by a body frame, which is not shown in the diagram. A known speed reducer 6 and a power conversion mechanism 7 are provided between the AC servo motor 3 and the slide 2. The brake apparatus 5 is a mechanism where an output shaft in the AC servo motor 3 is stopped by the output shaft being restricted by being clamped from the outside. A friction member, a plate which pressurizes the friction member, a plate guide member, and the like are provided in the brake apparatus 5.

In addition, the electric servo press 1 has a NC apparatus 10, an emergency stopping circuit 11, an electrical switch 12, and a linear scale 13.

The NC apparatus 10 has a CPU 10a, an input circuit 10b, a memory circuit 10c, an output circuit 10d, a feedback circuit (FB circuit) 10e, and the like. An activating switch 15, an emergency stopping button 16, a light-beam safety apparatus 17 which detects an operator due to blocking of a light beam, and a pulse coder 18 which detects rotation of the servo motor 3 are connected to the input circuit 10b. In addition, a servo alarm from the servo amplifier 3 is input into the input circuit 10b. Various types of parameter and programs which are set in advance are stored in the memory circuit 10c. A signal from the output circuit 10d is input into the servo amplifier 4 and the emergency stopping circuit 11. In addition, a signal from the servo amplifier 4 is input into the feedback circuit 10e.

The electrical switch 12 is connected to the output side of the emergency stopping circuit 11. In addition, switches 21 and 22 which are a normal open type of switch are respectively provided between a power supply source 20 and the servo amplifier 4 and the power supply source 20 and the brake apparatus 5. Each of the switches 21 and 22 are closed by the electrical switch 12 which is controlled by the emergency stopping circuit 11.

The linear scale 13 detects the absolute position of the slide 2. A signal from the linear scale 13 is input into the feedback circuit 10e in the NC apparatus 10. The NC apparatus 10 outputs a control signal to the servo amplifier 4 based on a feedback signal and aligns the position of the slide 2.

Press Activation

When the operator operates the activating switch 15, a slide activating signal is input into the NC apparatus 10. Due to this, each of the switches 21 and 22 are closed, electric power is supplied to the servo amplifier 4, and the brake apparatus 5 is in a brake cancelling state.

In addition, when a slide activating signal is input into the NC apparatus 10, a speed command (a voltage command which commands rotation of the servo motor 3) and a command which enables control of the servo motor 3 are output from the output circuit 10d to the servo amplifier 4 based on data which is set in advance in the storage circuit 10c. Then, the servo amplifier 4 converts electric power which is supplied from the power supply source 20 into a drive power signal according to the speed command, and then outputs the drive power signal to the servo motor 3. In addition, a pulse signal from the pulse coder 18 which is built into the servo motor 3 is fed back into the servo amplifier 4. Then, the servo motor 3 is controlled by the servo amplifier 4 so that the difference between the motor rotation speed which is calculated from the pulse signal (corresponding to the drive speed of the slide) and the speed command is reduced.

In addition, a feedback signal from the linear scale 13 is input to the NC apparatus 10 via the feedback circuit 10e. Then, the NC apparatus 10 outputs a control signal to the servo amplifier 4 based on the feedback signal, and due to this, the position of the slide 2 is aligned at the target position.

When a stopping signal from the emergency stopping button 16, a detection signal from the light-beam safety apparatus 17, a servo alarm from the servo amplifier 4, and the like are input into the input circuit 10b during a press operation, a stopping signal is output from the NC apparatus 10 to the emergency stopping circuit 11. A control signal is output from the emergency stopping circuit 11 with regard to the electrical switch 12 due to receiving of the stopping signal, and due to this, each of the switches 21 and 22 are in the open state. As a result, electric power is blocked to the servo amplifier 4 and the brake apparatus 5, the brake apparatus 5 is in a brake cancelling off (brake off=braking) state, and rotation of the servo motor 3 also stops.

Braking Performance Verifying Process

In a case where the emergency stopping process is carried out as above, a braking performance verifying process is executed as below.

Basic Concept

Figure 2:
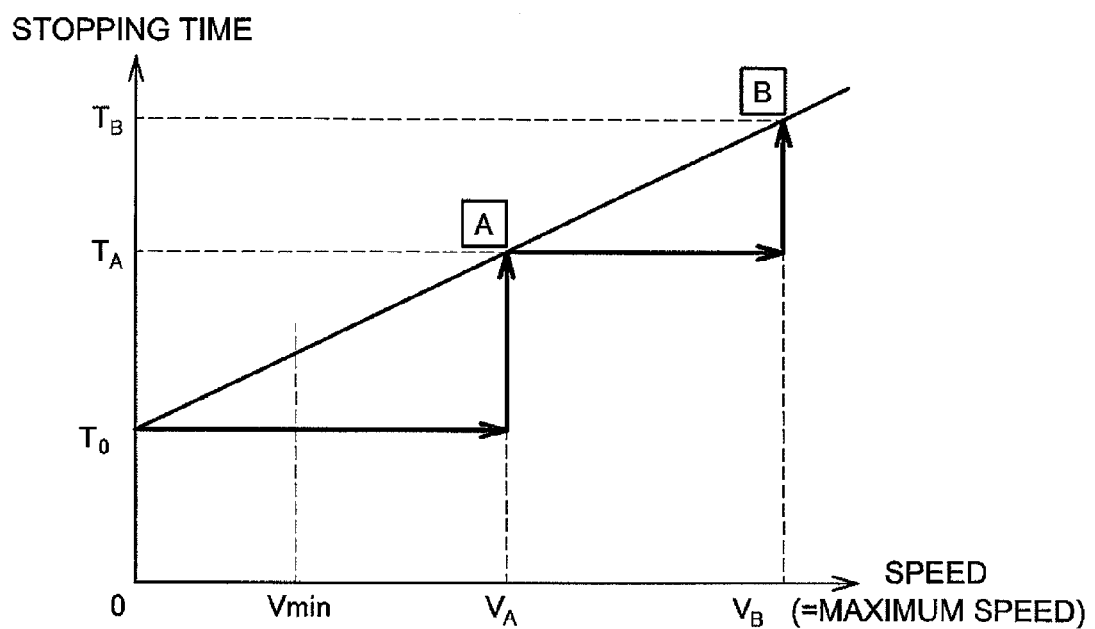
FIG. 2 is a diagram illustrating a relationship between speed of a slide and stopping time.

FIG. 2 illustrates a relationship between the drive speed of the slide 2 (horizontal axis) and stopping time (vertical axis). The stopping time from starting of braking at an arbitrary speed (VA) (point A) to actual stopping of the slide is set as TA, and the stopping time at the maximum drive speed of the slide (point B) is set as TB. As shown in FIG. 2, the drive speed and the stopping time have a proportional relationship. Accordingly, if a fixed stopping time (T0) (which will be described later) is considered and the speed and the stopping time at point A are determined, it is understood that it is possible to predict the stopping time at point B at the maximum drive speed and it is possible to verify braking performance using the predicted stopping time.

Figure 3:
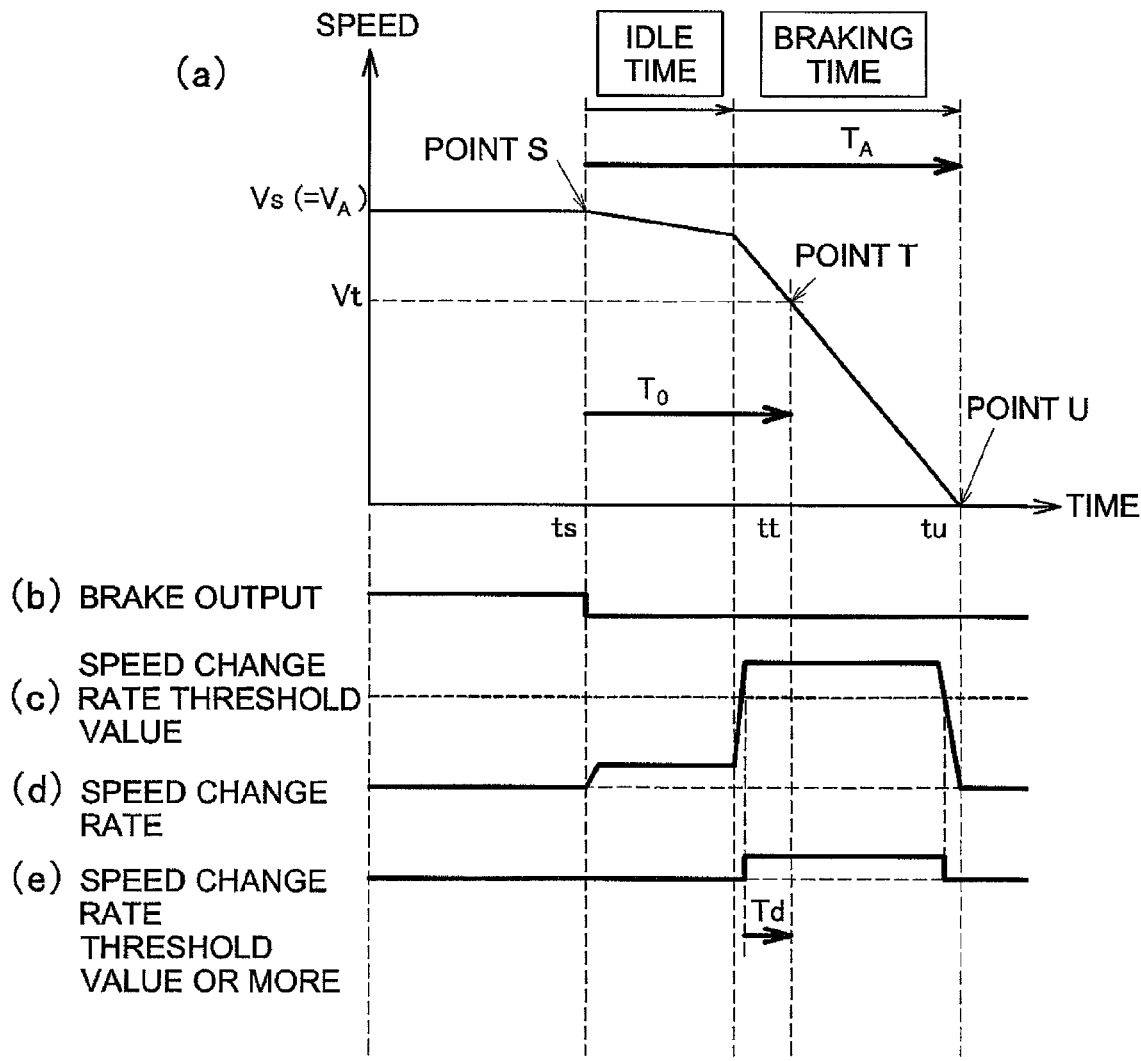
FIG. 3 is a diagram for describing a sequence where fixed stopping time is calculated.

Here, the fixed stopping time T0 includes idle time from the timing when there is a stopping instruction to actual starting of braking and is the time until braking force in the brake apparatus 5 stabilizes (refer to FIG. 3). The fixed stopping time T0 is determined by the specifications of the mechanisms in the brake apparatus 5 and changes with the passing of time such as attrition on each section which configures the brake apparatus 5.

Fixed Stopping Time T0

As described above, the fixed stopping time T0 varies due to the specifications of the mechanisms in the brake apparatus 5. Accordingly, setting the fixed stopping time T0 as a fixed value in advance is considered.

On the other hand, attrition on a friction member, friction on sliding sections in the mechanisms, and the like are generated due to use of the brake apparatus over a long period of time, and due to this, the fixed stopping time T0 changes. Accordingly, during the braking apparatus verifying process, it is preferable that the process for determining the fixed stopping time T0 be executed at the same time in combination with the verifying process. Below, calculation of the fixed stopping time T0 will be described using FIG. 3.

FIG. 3 illustrates a relationship (a) between time when there is an urgent stopping instruction (horizontal axis) and the slide drive speed (vertical axis). In addition, in combination with this relationship, an output signal waveform (brake output) to the brake apparatus 5 (b), the rate of change in drive speed (d), and a comparative result (e) of the rate of change in drive speed (d) and a threshold value (c) are illustrated.

When there is an urgent stopping instruction at a timing ts while the slide 2 is being lowered at a drive speed Vs (equivalent to a speed VA in FIG. 2), a signal for cancelling the brake cancelling state (brake output) of the brake apparatus 5 is off. That is, there is a brake off command at the timing ts. In addition, at the same time, a rotation command to the servo motor 3 is also off. As a result, the speed of the slide 2 is gradually reduced from point S in (a) of FIG. 3.

Then, the rate of change in speed suddenly changes at a certain timing. This has the meaning that a plate for pressurizing abuts against a friction member in the brake apparatus 5 after the idle time passes and actual braking starts. Here, in order to reliably verify that there is a braking state and the braking force is stabilized, the time until the point in time (a timing tt at point T in FIG. 3) when the value of the rate of change in speed is the threshold value or more has continued for a predetermined time (Td) is set as the fixed stopping time T0. That is, the fixed stopping time T0 is the time when the time until the braking force of the brake apparatus 5 stabilizes is added to the idle time.

Here, in a case where the fixed stopping time T0 as above is longer than the time which is set in advance, a process such as notifying of a warning is executed as there is an abnormality in the mechanisms in the brake apparatus 5.

Braking Performance Verifying Process

Figure 4:
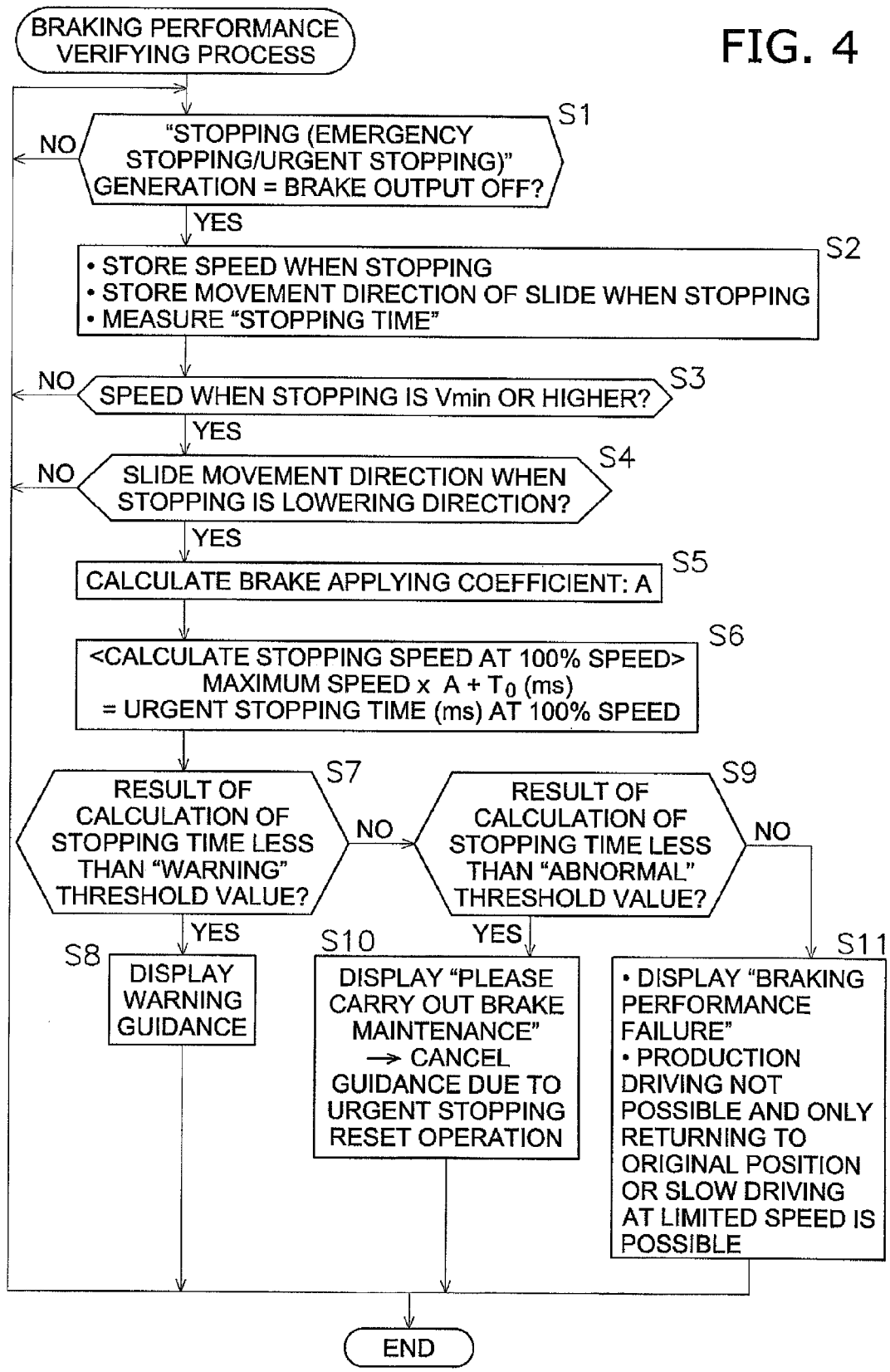
FIG. 4 is a flow chart of a braking performance verifying process.

Next, the braking performance verifying process will be described in detail using the flow chart in FIG. 4.

First, in step S1, it is determined whether or not a stopping instruction for emergency stopping or urgent stopping of the slide 2 is generated. The stopping instruction is generated due to operation of the emergency stopping button 16, generation of a servo alarm, detection of a signal from the light-beam safety apparatus 17, or the like. In a case where a stopping instruction is generated, brake cancelling output is set to off and the braking apparatus 5 is activated.

Next, in step S2, data is taken on a slide drive speed Vs and the slide movement direction when the stopping instruction is generated. In addition, the stopping time is measured. The slide drive speed is determined using a signal from the pulse coder 18 in the servo motor 3. Here, the pulse coder 18 belongs to the servo motor 3 in FIG. 1, but the pulse coder 18 may be provided in the speed reducer 6. In addition, a second pulse coder which is different to the pulse coder 18 which belongs to the servo motor 3 may be provided in the speed reducer 6 and the slide drive speed may be determined using a signal from the second pulse coder.

In addition, in step S2, the time TA (refer to (a) of FIG. 3) from generation of the stopping instruction to stopping of the slide is measured. Here, stopping of the slide 2 is determined when the signal from the pulse coder 18 has not changed for a predetermined time or the signal from the pulse coder 18 moving in an opposite direction has been shown.

In step S3, it is determined whether or not the slide drive speed Vs when the stopping instruction is generated is equal to or more than a minimum drive speed Vmin. In a case where the drive speed of the slide 2 is low and does not reach the speed Vmin, the slide drive speed and the stopping time do not have a stable proportional relationship and it is not possible to accurately measure the stopping time. Accordingly, the following process is executed only in cases where the slide drive speed is equal to or more than the minimum drive speed Vmin.

In step S4, it is determined whether or not the movement direction of the slide 2 when the stopping instruction is generated is the lowering direction. A work piece holding spring provided on the punch side and a die cushion act in a direction to push the slide 2 upward when the slide is being raised. Accordingly, there is a trend where the stopping time is longer during raising of the slide compared to during lowering of the slide even when the drive speed of the slide 2 is the same. Accordingly, here, the following process is executed only when the slide 2 is being lowered.

The process moves to step S5 in a case where the slide drive speed when the stopping instruction is generated is equal to or more than the minimum drive speed Vmin and the movement direction of the slide 2 is the lowering direction. A braking performance coefficient A is calculated in step S5. The braking performance coefficient A is determined using the following formula.

$$A = (TA - T0)/Vt \quad (1)$$

Vt: slide drive speed when fixed stopping time (the timing tt) has passed (refer to (a) of FIG. 3)

It is possible to determine a predicted stopping time Tn using the following linear function in a case where the slide drive speed when the stopping instruction is generated is Vn by determining the braking performance coefficient A above.

$$Tn = A \times Vn + T0 \quad (2)$$

In step S6, a predicted maximum stopping time Tmax when the slide is driven at the maximum drive speed TMax is determined using the formula (1) and (2) above.

$$Tmax = A \times Vmax + T0 \quad (3)$$

Here, in formula (3), the maximum drive speed Vmax is used as it is without using a speed (Vmax−α) when the idle time has passed since the maximum drive speed. This is because it is difficult to accurately grasp to what extent the maximum drive speed is reduced during the idle time when there is a stopping instruction at the maximum drive speed. Accordingly, the maximum drive speed Vmax is used in formula (3) such that the predicted stopping time is longer, that is, on the safe side.

Here, Vmax may be changed to "Vmax−(VS−VT)" in formula (3) with the speed reduction at the idle time as the same as (VS−VT) in FIG. 3.

Next, in step S7, it is determined whether or not the predicted maximum stopping time Tmax which is determined in step S6 is less than a warning threshold value. As shown by a straight line B1 in FIG. 5, the process moves from step S7 to step S8 in a case where the predicted maximum stopping time Tmax is less than the warning threshold value. In step S8, normal guidance display is performed in a display apparatus or the like in the NC apparatus showing that there are no problems with the braking performance.

Figure 5:
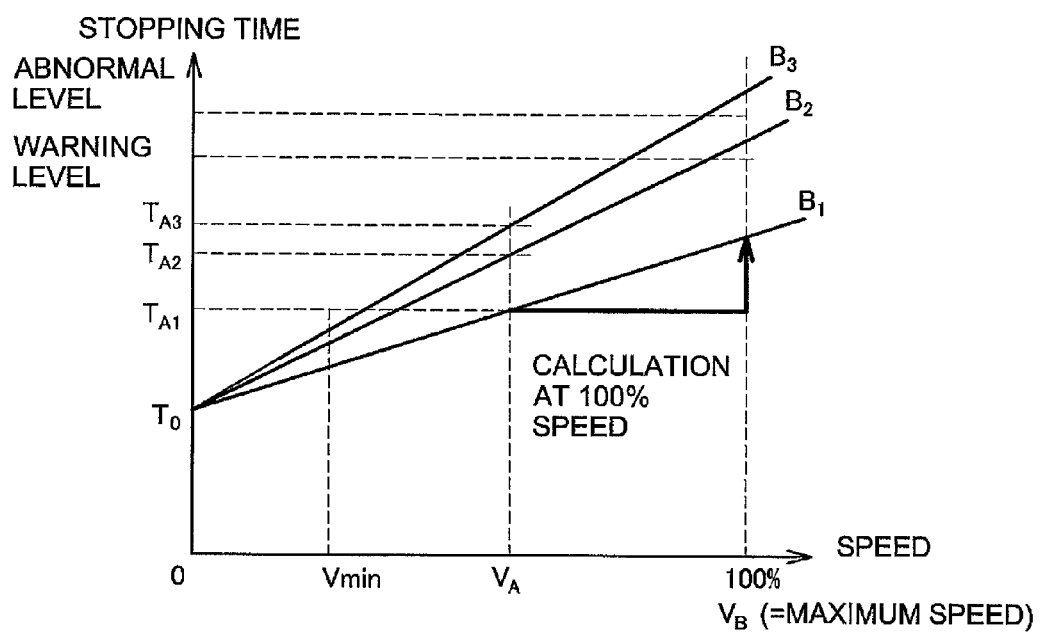
FIG. 5 is a diagram illustrating a relationship between speed of a slide and stopping time and a relationship between a warning level and an abnormal level.

Here, FIG. 5 illustrates a relationship between the speed of the slide 2 and the stopping time. In the diagram, VA is the slide speed when there is a stopping instruction and "100%" expresses the maximum speed of the slide 2. In addition, TA1, TA2, and TA3 express respective times from when there is the stopping instruction to the stopping of the slide 2. Here, as described above, the slide drive speed Vt at the timing tt where the braking force is stable is used when determining the coefficient A. Since the speed Vt is slow compared to the speed VA, actual calculation of the gradient of the inclined line in FIG. 5 is slightly larger and the gradient is determined to be on the safe side.

In addition, the process moves from step S7 to step S9 in a case where the predicted maximum stopping time Tmax is equal to or more than the warning threshold value. In step S9, it is determined whether or not the predicted maximum stopping time Tmax is less than an abnormal threshold value. As shown by a straight line B2 in FIG. 5, the process moves from step S9 to step S10 in a case where the predicted maximum stopping time Tmax is less than the abnormal threshold value. In step S10, a warning display such as "please carry out brake maintenance" is performed. Then, the warning display is deleted when the operator performs an urgent stop reset operation.

In addition, as shown by a straight line B3 in FIG. 5, the process moves from step S9 to step S11 in a case where the predicted maximum stopping time Tmax is equal to or more than the abnormal threshold value. In this case, in step S11, a display such as "braking performance failure" is performed and a process which prohibits production driving is executed with the braking performance deemed to be below standard and a process which prohibits production driving is executed.

In this case, only return of the slide to its original position and inching motion at a speed which is limited is possible.

Characteristics (1) It is possible to verify and evaluate braking performance without a complicated operation since the braking performance verifying process is automatically performed in a case where an emergency stopping process is executed due to blocking of a light beam from the light-beam safety apparatus or the like during a press operation.

(2) It is possible to accurately perform the verifying process since the braking performance verifying process is performed only in a case where the slide speed is equal to or more than a predetermined speed.

(3) It is possible to detect an abnormality in the mechanisms which configure the brake apparatus 5 since the process where the fixed stopping time is determined is executed in combination with the braking performance verifying process. Accordingly, it is possible to accurately grasp whether there are defects at the mechanism side of the brake apparatus 5 or whether the braking performance has deteriorated.

(4) The time while the braking force of the brake apparatus is stabilized is considered in addition to the idle time when the fixed stopping time is determined. Accordingly, it is possible to accurately verify braking performance.

(5) The braking performance verifying process is executed only when the slide 2 is being lowered. As a result, it is possible to eliminate the effects of a spring or the like which is provided on the press machine side when determining the fixed time and it is possible to more accurately measure the stopping time.

Other Embodiments

The present invention is not limited to the embodiment as above, and various modifications and alterations are possible without departing from the scope of the invention.

(a) In the embodiment described above, the fixed stopping time is determined using a calculation, but a fixed value where the specifications of the brake apparatus and the like are considered may be used.

Figure 6:
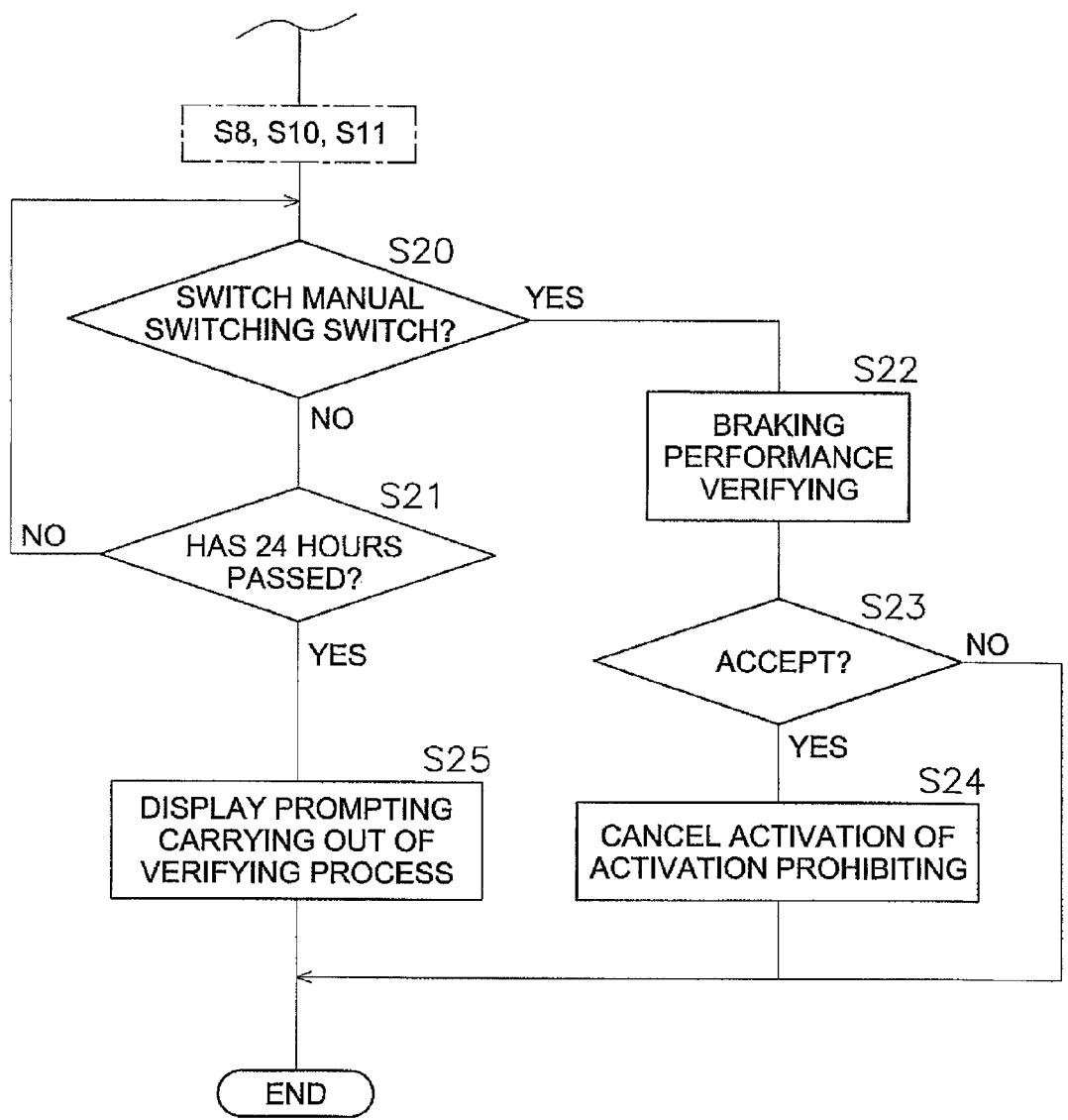
FIG. 6 is a flow chart of another embodiment of a braking performance verifying process.

(b) A process as shown in FIG. 6 may be executed after the processes of steps S8 to S11.

That is, in step S20 in FIG. 6, it is determined whether or not a manual switch is operated. In addition, in step S21, it is determined whether or not, for example, 24 hours has passed since executing of steps S8 to S11.

As described above, production driving is prohibited in a case where the predicted stopping time is equal to or more than a threshold value which indicates an abnormality. Here, it is not preferable to carry out trial driving or the like soon after resetting since the brake apparatus in the press machine is an important apparatus. Therefore, here, first, a verifying process in a manual mode is executed. The manual switch is a switch for executing the braking performance verifying process in the manual mode.

The process moves from step S20 to step S22 in a case where the manual switch is operated. In step S22, the slide is driven at the maximum drive speed and the stopping time is measured. In step S23, it is determined whether or not the stopping time satisfies a predetermined standard. The process moves from step S23 to step S24 in a case where the stopping time satisfies the predetermined standard. In step S24, prohibiting of the production driving in step S11 is cancelled.

In addition, the braking performance verifying process is not executed over time in a case where an instruction such as urgent stopping is not detected for a long period of time. Therefore, in step S21, it is determined whether or not 24 hours has passed since executing of steps S8 to S11. The process moves from step S21 to step S25 in a case where 24 hours has passed since executing of steps S8 to S11. Here, a process which prompts carrying out of the braking performance verifying process in manual mode is executed.

Figure 7:
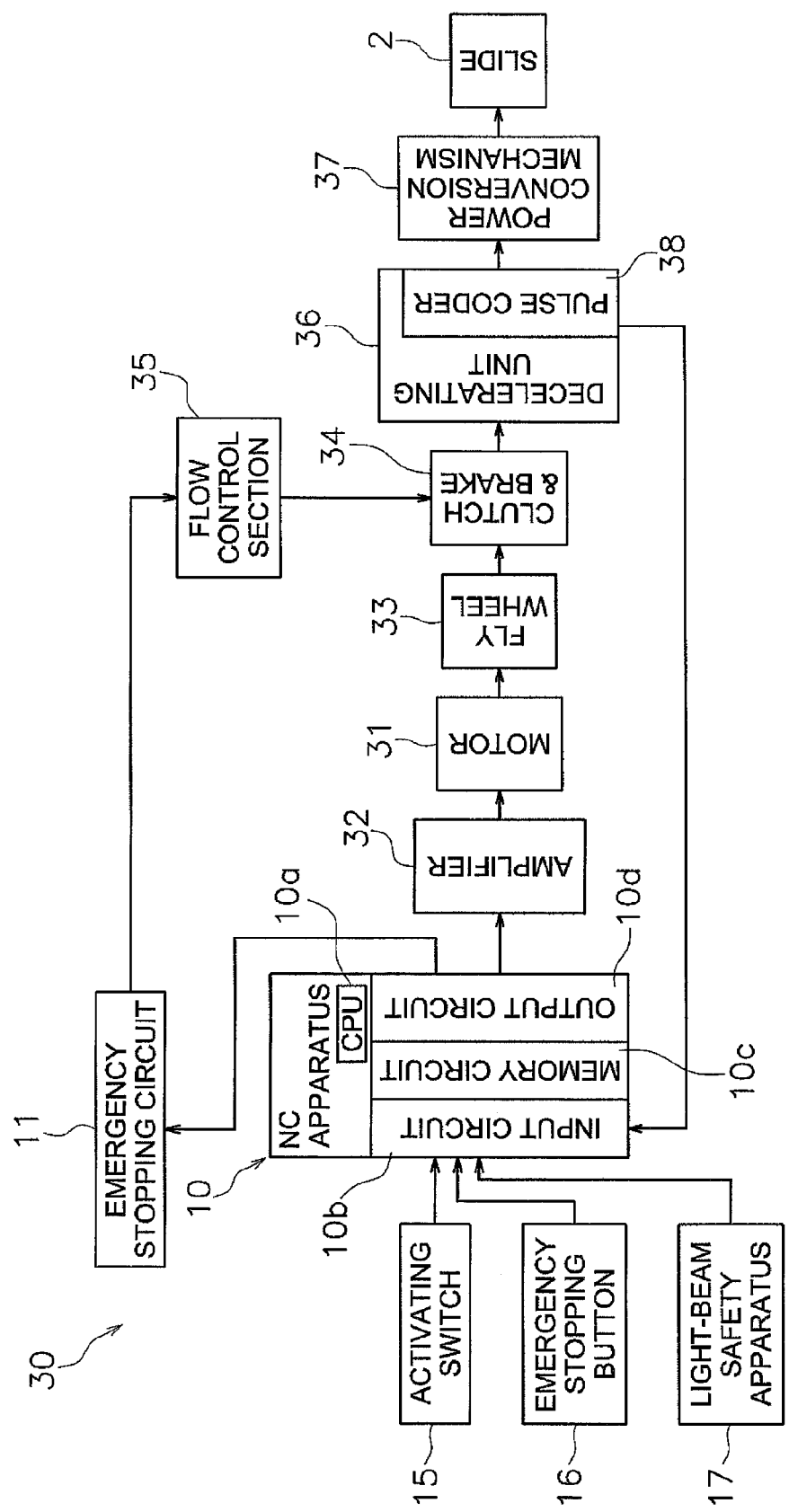
FIG. 7 is a system block diagram of a mechanical press unit.

(c) In the embodiment described above, the present invention is applied to an electric servo press, but it is possible to apply the present invention in the same manner to another type of press machine. A block diagram of a mechanical press unit is illustrated in FIG. 7.

The press unit 30 is provided with the slide 2, a motor 31, an amplifier 32, a fly wheel 33, a clutch brake 34, a flow control section 35, a speed reducer 36, and a power conversion mechanism 37. In addition, the press unit 30 has the NC apparatus 10, the emergency stopping circuit 11, the activating switch 15, the emergency stopping button 16, and the light-beam safety apparatus 17 in the same manner as the configuration in FIG. 1. The pulse coder 38 is provided in the speed reducer 36.

In the press unit 30, the motor 31 is driven using control signals from the amplifier 32. The fly wheel 33 is rotated using the motor 31 and rotation energy is accumulated in the fly wheel 33. The rotation energy of the fly wheel 33 is transferred to the speed reducer 36 via the clutch brake 34 and is further transferred to the power conversion mechanism 37. The power conversion mechanism 37 is, for example, an eccentric mechanism and the rotation driving is converted into up and down driving by the mechanism. Due to this, the slide 2 is raised and lowered.

The clutch brake 34 is controlled by air pressure or liquid pressure from the flow control section 35. The clutch brake 34 is turned on or off at a predetermined timing. Then, when a stopping instruction is output from the emergency stopping circuit 11, the clutch brake 34 is controlled such that the clutch is off (cancelling of engagement) and the brake is on using the flow control section 35. Due to this, the slide 2 is stopped.

Here, the position of the slide 2 is determined by press angles which are calculated from the output of the pulse coder 38.

INDUSTRIAL APPLICABILITY

According to the apparatus of the present invention, it is possible to automatically verify braking performance in a press machine when there is an instruction for urgent stopping, emergency stopping, or the like.

The invention claimed is:

1. A press machine braking performance verifying apparatus for verifying performance of brakes which apply braking to a slide of a press machine, the press machine braking performance verifying apparatus comprising:
    a slide speed sensor configured to detect a slide driving speed at which the slide is driven and output a slide speed signal indicating the detected slide driving speed; and
    a controller arranged to receive the slide speed signal from the slide speed sensor and to receive an emergency stop instruction signal from an emergency stop instruction device of the press machine, the emergency stop instruction signal being a signal instructing the slide to be stopped,
    the controller being programmed to
        measure a stopping time from when a stopping instruction is detected until the slide stops, the stopping time being a sum of an idle time from detecting of a stopping instruction until a start of braking and a braking time from the start of braking until stopping of the slide,
        calculate a predicted stopping time in a case where the slide is driven at a maximum driving speed by
            determining a deceleration coefficient based on
                the slide driving speed at a predetermined timing during the braking time and
                an amount of time from the predetermined timing to stopping of the slide,
            calculating a fixed stopping time by adding the idle time to the time from the start of braking until the predetermined timing, and
            calculating the predicted stopping time based on a fixed stopping time, the maximum driving speed of the slide, and the deceleration coefficient,
        execute a performance evaluation of the brakes by comparing the predicted stopping time and abnormal threshold value set in advance, and
    limit operation of the slide if the performance evaluation indicates a braking performance failure.

2. The press machine braking performance verifying apparatus according to claim 1, wherein
    the controller is programmed to measure the stopping time, calculate the maximum stopping time, and execute the performance evaluation only in a case where the slide driving speed when the stopping instruction is detected is a predetermined speed or more.

3. The press machine braking performance verifying apparatus according to claim 1, wherein
    the fixed stopping time is a fixed value which is set in advance.

4. The press machine braking performance verifying apparatus according to claim 1, wherein
    the controller if further configured to
        detect a change in the slide driving speed and to determine whether the change in the slide driving speed exceeds a predetermined threshold value, and
        calculate the time from the timing when the stopping instruction is detected to the timing when the change in the slide driving speed exceeds the predetermined threshold value as the fixed stopping time.

5. The press machine braking performance verifying apparatus according to claim 1, wherein
    the controller if further programmed to detect a movement direction of the slide, and
    the controller is programmed to measure the stopping time, calculate the maximum stopping time and execute the performance evaluation only when a stopping instruction is detected while the slide is being lowered.

6. The press machine braking performance verifying apparatus according to claim 1, wherein
    the controller is further configured to compare the predicted stopping time to a warning value that is set in advance, the warning value being smaller than the abnormal threshold value
        provide a notification of a warning in a case where the predicted stopping time is equal to or more than the warning value and is less than the abnormal threshold value and
        prohibit activation of the press machine in a case where the predicted stopping time is the abnormal threshold value or more.

7. The press machine braking performance verifying apparatus according to claim 1, wherein
the controller is programmed
to determine whether or not a predetermined period of time has passed since an evaluation was carried out by the evaluating component and
if the predetermined period of time has passed, to issue a notification prompt informing that the braking performance evaluation has not been performed since the predetermined period of time passed.

8. The press machine braking performance verifying apparatus according to claim 6, further comprising:
an operating component configured to execute a braking performance verifying test,
the controller being programmed to permit an activation in order to verify braking performance in a case where the operating component is operated even in a case where activation of the press machine has been prohibited based the result of the performance evaluation.

9. The press machine braking performance verifying apparatus according to claim 8, wherein
the controller is further programmed to
determine whether or not a result of the braking performance verifying test satisfies a predetermined standard and
cancel prohibiting of activation of the press machine in a case where it is determined that braking performance satisfies the predetermined standard.

10. The press machine braking performance verifying apparatus according to claim 1, wherein
the controller limits operation of the slide by limiting the slide driving speed.

11. The press machine braking performance verifying apparatus according to claim 1, wherein
the controller limits operation of the slide by allowing only a movement of the slide to an original position.

12. The press machine braking performance verifying apparatus according to claim 1, wherein
the controller is further programmed to output a notification signal indicating a result of the performance evaluation, and
the press machine braking performance verifying apparatus further includes an indication device configured to receive the notification signal from the controller and indicate the result of the performance evaluation.

13. The press machine braking performance verifying apparatus according to claim 12, wherein
the indication device is a display apparatus.

14. The press machine braking performance verifying apparatus according to claim 12, wherein
the controller is further programmed to
compare the predicted stopping time to a warning value that is set in advance, the warning value being smaller than the abnormal threshold value,
set the notification signal to indicate a warning in a case where the predicted stopping time is equal to or larger than the warning value and smaller than the abnormal threshold value, and
prohibit activation of the press machine and set the notification signal to indicate that activation of the press machine is prohibited in a case where the predicted stopping time is equal to or larger than the abnormal threshold value.

15. A press machine braking performance verifying apparatus for verifying performance of brakes which apply braking to a slide of a press machine, the press machine braking performance verifying apparatus comprising:
a slide speed sensor configured to detect a slide driving speed at which the slide is driven and output a slide speed signal indicating the detected slide driving speed;
a controller arranged to receive the slide speed signal from the slide speed sensor and to receive an emergency stop instruction signal from an emergency stop instruction device of the press machine, the emergency stop instruction signal being a signal instructing the slide to be stopped; and
an indication device configured and arranged to be operated by signals from the controller,
the controller being programmed to
measure a stopping time from when a stopping instruction is detected until the slide stops, the stopping time being a sum of an idle time from detecting of a stopping instruction until a start of braking and a braking time from the start of braking until stopping of the slide,
calculate a predicted stopping time in a case where the slide is driven at a maximum driving speed by
determining a deceleration coefficient based on
the slide driving speed at a predetermined timing during the braking time and
an amount of time from the predetermined timing to stopping of the slide,
calculating a fixed stopping time by adding the idle time to the time from the start of braking until the predetermined timing, and
calculating the predicted stopping time based on a fixed stopping time, the maximum driving speed of the slide, and the deceleration coefficient,
execute a performance evaluation of the brakes by comparing the predicted stopping time and a threshold value set in advance, and
output a notification signal indicating a result of the performance evaluation to the indication device.

16. The press machine braking performance verifying apparatus according to claim 15, wherein
the threshold value includes
a warning value that is set in advance and
an abnormal value that is larger than the warning value and indicates a braking performance failure,
the controller is programmed to limit operation of the slide in a case where the predicted stopping time is equal to or larger than the abnormal value, and
the notification signal indicates
a warning in a case where the predicted stopping time is equal to or larger than the warning value and is smaller than the abnormal value and
that the braking performance failure has occurred in a case where the predicted stopping time is equal to or larger than the abnormal value.

17. The press machine braking performance verifying apparatus according to claim 16, wherein
the controller is further programmed to prohibit activation of the press machine when the predicted stopping time is equal to or larger than the abnormal value.

18. A press machine, comprising
a slide;
a brake arranged and configured to brake the slide;
a slide speed sensor configured to detect a slide driving speed at which the slide is driven and output a slide speed signal indicating the detected slide driving speed;
an emergency stop instruction device configured to generate an emergency stop instruction signal, the emergency stop instruction signal being a signal instructing the slide to be stopped; and a controller programmed to control operation of the slide and the brake, the controller arranged to receive the slide speed signal from the slide speed sensor and to receive the emergency stop instruction signal from the emergency stop instruction device, the controller including a press machine braking performance verifying section programmed to measure a stopping time from when a stopping instruction is detected until the slide stops, the stopping time being a sum of an idle time from detecting of a stopping instruction until a start of braking and a braking time from the start of braking until stopping of the slide, calculate a predicted stopping time in a case where the slide is driven at a maximum driving speed by determining a deceleration coefficient based on the slide driving speed at a predetermined timing during the braking time and an amount of time from the predetermined timing to stopping of the slide, calculating a fixed stopping time by adding the idle time to the time from the start of braking until the predetermined timing, and calculating the predicted stopping time based on a fixed stopping time, the maximum driving speed of the slide, and the deceleration coefficient, and execute a performance evaluation of the brakes by comparing the predicted stopping time and a threshold value set in advance.

* * * * *